3,522,954
STACKABLE TRUCK CONSTRUCTION
John A. Locke, Glendale, Calif., assignor to General Host Corporation, New York, N.Y., a corporation of New York
Filed May 1, 1968, Ser. No. 725,656
Int. Cl. B60r 27/00
U.S. Cl. 280—33.99                        4 Claims

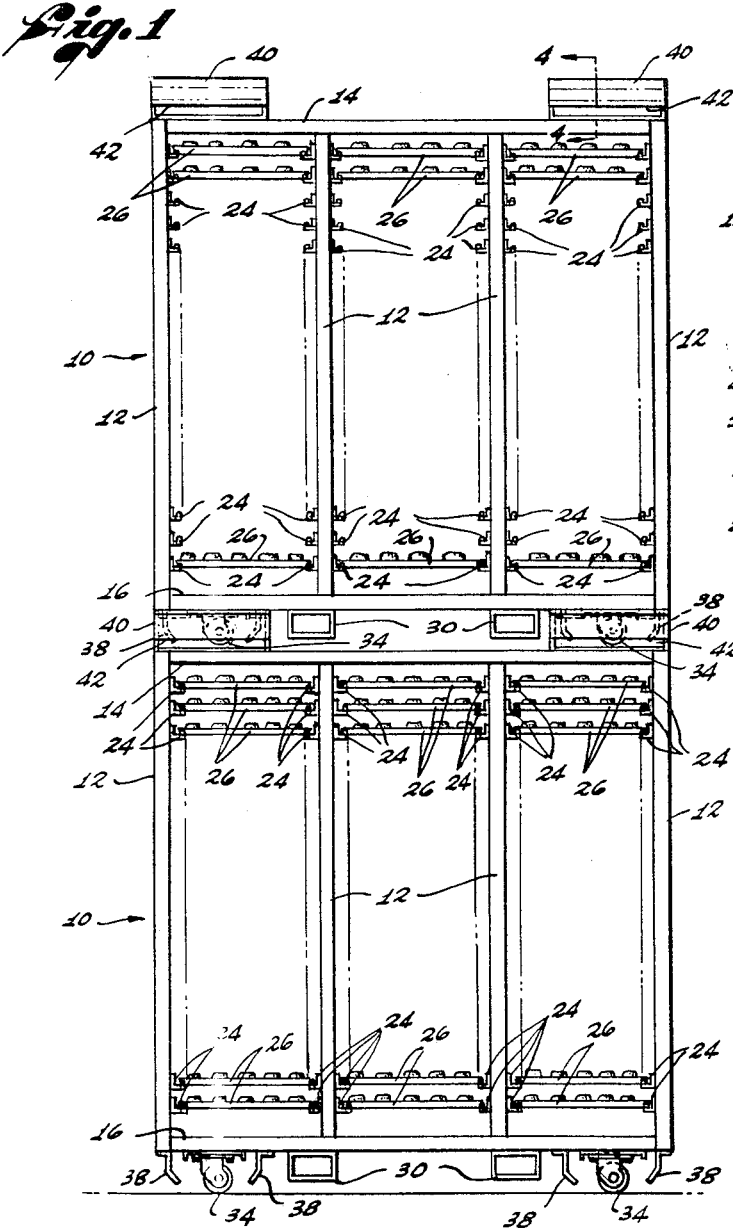
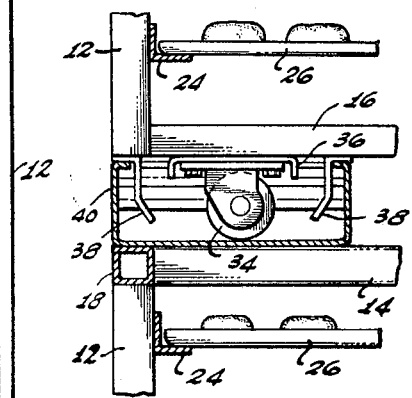
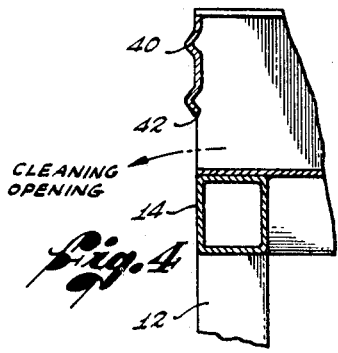
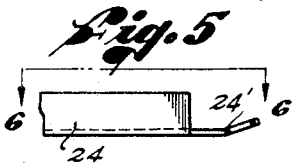
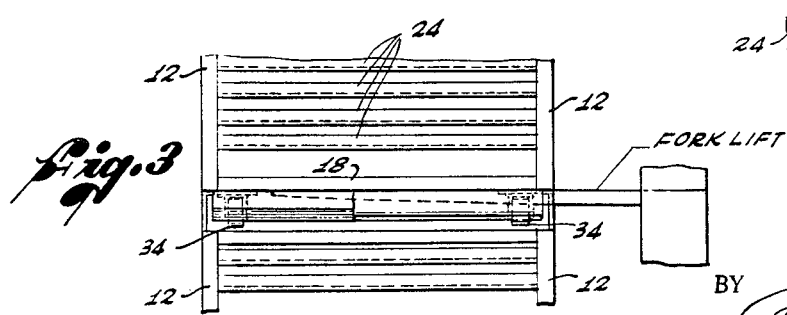
Aug. 4, 1970 — J. A. LOCKE — 3,522,954
STACKABLE TRUCK CONSTRUCTION
Filed May 1, 1968
INVENTOR.
JOHN A. LOCKE
BY Perry E. Turner
ATTORNEY

United States Patent Office 3,522,954
Patented Aug. 4, 1970

ABSTRACT OF THE DISCLOSURE

An upright container has spaced pairs of caster wheels located between pairs of downwardly extending and converging guide plates. Mounted on top of each container are spaced open top receptacles to receive the pairs of guide elements of another such container. Intermediate the pairs of guide elements are spaced tubes to receive the forks of a lift truck. The containers shown have vertically and horizontally spaced rails to support trays for foodstuffs and the like. The front ends of such rails are bent upwardly to prevent trays thereon from being dislodged when the container is tilted.

BACKGROUND OF THE INVENTION

Field of the invention

This invention relates to containers adapted for vertical stacking, such as the type of truck shown in U.S. Pat. No. 2,827,302.

Description of the prior art

In large commerical bakeries, it is customary to place trays of baked goods in open-type carts or trucks. Typically, such an open truck is formed of a pair of spaced rectangular frames secured together, with vertically and horizontally spaced rails extending between the frames for supporting the edges of trays of baked goods which must be stored pending delivery.

Such trucks are provided with caster wheels to permit them to be moved to a storage area, such as a refrigeration room. To achieve maximum utilization of any given storage space, it is of course desirable to be able to stack such trucks. However, stackable truck constructions of the prior art have not been suitable to avoid the likelihood of foodstuffs in a truck being contaminated by debris dislodged from the wheels of another truck placed thereon. In this connection, should such a truck be stacked on and removed from another, debris dislodged from the wheels onto the top of such other truck is not confined, but is free to be blown or vibrated about so that it can fall onto foodstuffs on trays in the lower truck.

SUMMARY OF THE INVENTION

The invention embraces an upright container having top and bottom sets of parallel plates of different spacings so as to permit such sets on different containers to telescope or nest, thereby to prevent relative lateral movement between the stacked containers. Also embraced are caster wheels mounted between associated bottom plates, so that such wheels are confined when such containers are stacked. Further, the invention embraces tray support rails shaped to prevent trays from being dislodged during tilting of the container when it is placed on or removed from another container.

BRIEF DESCRIPTION OF THE DRAWING

FIG. 1 is a front elevation view of a pair of stacked containers having a construction in accordance with my invention;

FIG. 2 is an enlarged sectional view of mating portions of the stacked containers;

FIG. 3 is a fragmentary side elevation view of the vicinity of the mated portions of the stacked containers;

FIG. 4 is an enlarged sectional view taken along the line 4—4 of FIG. 1;

FIG. 5 is a side elevation view of the front portion of a tray support rail formed in accordance with my invention; and FIG. 6 is a top plan view taken along the line 6—6 of FIG. 5.

DESCRIPTION OF THE PREFERRED EMBODIMENT

Referring to FIG. 2, two pallet trucks 10 are shown vertically stacked. In the arrangement shown, each truck is a container formed of a pair of rectangular frames of the same dimensions. Each frame may be formed by welding the ends of spaced vertical tubular elements 12 to upper and lower horizontal tubular elements 14, 16. The frames are secured together by means of a number of tubular elements 18 (see FIG. 3) extending between and secured at their ends to the frames.

Extending between and secured at their ends to the vertical frame portions 12 are a plurality of pairs of tray support rails 24. The rails 24 preferably are rigid, and may be formed of angles which are soldered or welded to the vertical frame portions 12. As shown, the rails 24 are adapted to support the edges of trays 26 containing baked goods. In addition, the rails 24 serve to make the entire unit extremely rigid.

The rails 24 are additionally shaped to prevent trays supported thereon from sliding out of the front of the container when it is lifted onto the top of another container. To facilitate lifting, each container is provided with a pair of tubular elements 30 of sufficient size to receive the forks of a lift truck (FIGS. 1 and 3). In the arrangement shown, the tubes 30 are secured to the bottoms of the containers, which may be by welding or soldering them to the lower frame elements 16. When such a container is being carried on the forks, and while it is being placed on or removed from the top of another container, tilting of the container towards the lift truck tends to cause the trays 26 to slide forwardly and to fall out of the container.

To avoid dislodging of the trays, and referring to FIGS. 5 and 6, I form the outer ends of the rails 24 with extensions 24' that are slightly bent upwardly. Should a tray start to slide out when the container is tilted, it comes against the bent extensions 24' and is thereby prevented from being dislodged.

As shown in FIGS. 1 and 2, the containers are provided with casters 34 outboard of the tubular elements 30. By way of example, rigid plates 36 are secured to the bottom frame portions 16, as by welding, and the frames of the casters 34 are bolted to the plates 36. Each of the plates 36 extends between a pair of guide elements 38, which are formed as angles with one side secured to the bottom of the frame, and with their other sides extending downwardly and slightly convergent.

The guide elements 38 and casters 34 are adapted to enter or be nested in receptacles 40 on the top of another container. Each receptacle 40 is formed as a channel, the bottom of which is secured as by welding to the upper frames portions 14. The upper edges of the walls of the channel are shaped so that the horizontal portions of the guide elements 38 can seat thereon. In the arrangement shown, the upper edges of the walls of the channel are bent horizontally to provide substantial surface area of contact for the horizontal portions of the guide elements 38. Preferably, the receptacles are sufficiently deep that the caster wheels do not touch the bottoms of the channels when containers are stacked.

As will now be apparent from inspection of FIG. 2, the inwardly bent edges of the guide elements 38 facilitate their entry into the receptacles 40 when their associated container is being lowered onto another container. Further, by virtue of the shape of the guide elements 38, they readily clear the sides of the receptacle 40 when their associated container is being lifted clear of the lower container.

Additionally, each of the receptacles 40 is essentially formed as a box having a top opening, and wherein one end wall is provided with a bottom opening 42 (see FIGS. 1 and 4). The end opening 42 is provided to facilitate cleaning and removal of debris from the receptacle 40.

From the foregoing, it will now be apparent that my invention provides unique cooperable means to facilitate quick stacking and unstacking of containers, and with which wheels on the containers are confined while stacked so that debris from the wheels is not free to move laterally over the top of the container and fall into its contents. If desired, the top of the container intermediate the receptacles 40 can be covered, thereby to further minimize the possibility of dirt and debris falling through to the trays.

It will be apparent that various modifications can be made in various features of the container structure illustrated and described without departing from the spirit and scope of my invention.

I claim:
1. In combination:
an upright container;
spaced pairs of vertical plates extending below the bottom of said container;
pairs of vertical plates extending above the top of said container,
the plates of each bottom pair being oriented the same as the plates of a respective top pair,
the plates of similarly oriented top and bottom pairs being spaced so that the inner surfaces of one pair are farther apart than the outer surfaces of the other pair,
the outer edges of the more closely spaced plates being formed so as to be slightly convergent;
and a caster wheel assembly located between each pair of bottom plates.

2. The combination of claim 1, wherein the vertical dimensions of the top plates are greater than the vertical dimensions of the bottom plates.

3. The combination of claim 2, wherein said container has front and rear openings;
a plurality of vertically and horizontally spaced pairs of tray-supporting elements extending between said front and rear openings,
the front ends of said tray-supporting elements being bent upwardly at an acute angle with respect to the horizontal.

4. The combination of claim 2, including channels on the top of said container,
the walls of said channels forming the top pairs of plates,
end plates extending across the ends of each channel,
and an end plate for each channel being spaced from the bottom of the channel.

References Cited
UNITED STATES PATENTS

| | | | |
|---|---|---|---|
| 2,362,532 | 11/1944 | Bilek | 211—126 |
| 2,452,356 | 10/1948 | Coit. | |
| 2,652,174 | 9/1953 | Shea et al. | 220—97 X |
| 2,924,340 | 2/1960 | Barto | 108—53 |
| 3,147,860 | 9/1964 | Kean et al. | 108—53 X |

LEO FRIAGLIA, Primary Examiner

M. L. SMITH, Assistant Examiner

U.S. Cl. X.R.

280—79.3; 108—53; 220—97